US012569985B2

(12) United States Patent
Shahapurkar et al.

(10) Patent No.: US 12,569,985 B2
(45) Date of Patent: Mar. 10, 2026

(54) RUNTIME ASSESSMENT OF SUCTION GRASP FEASIBILITY

(71) Applicant: Siemens Aktiengesellschaft, Munich (DE)

(72) Inventors: Yash Shahapurkar, Berkeley, CA (US); William Yamada, Madison, WI (US); Eugen Solowjow, Berkeley, CA (US); Gokul Narayanan Sathya Narayanan, Emeryville, CA (US)

(73) Assignee: Siemens Aktiengesellschaft, Munich (DE)

( * ) Notice: Subject to any disclaimer, the term of this patent is extended or adjusted under 35 U.S.C. 154(b) by 90 days.

(21) Appl. No.: 18/398,428

(22) Filed: Dec. 28, 2023

(65) Prior Publication Data

US 2024/0238968 A1    Jul. 18, 2024

(30) Foreign Application Priority Data

Jan. 12, 2023    (EP) .................................... 23151339

(51) Int. Cl.
*B25J 9/16* (2006.01)
*B25J 15/00* (2006.01)
*B25J 15/06* (2006.01)
*B25J 15/08* (2006.01)

(52) U.S. Cl.
CPC ........... *B25J 9/1612* (2013.01); *B25J 9/1697* (2013.01); *B25J 15/0066* (2013.01); *B25J 15/0616* (2013.01); *B25J 15/08* (2013.01)

(58) Field of Classification Search
CPC .... B25J 9/1612; B25J 9/1697; B25J 15/0066; B25J 15/0616; B25J 15/08; G05B 2219/39045; G05B 2219/39125; G05B 2219/39536; G05B 2219/39542; G05B 2219/39543; G05B 2219/40155; G05B 2219/40629; G06V 10/431; G06V 10/48; G06V 20/10; G06V 20/64; G06V 2201/06
See application file for complete search history.

(56) References Cited

U.S. PATENT DOCUMENTS

2021/0078170 A1* 3/2021 Jiang ..................... B25J 15/0616
2021/0374524 A1* 12/2021 Feng .................... G06F 18/2453
2022/0004206 A1* 1/2022 Saito ........................ G06T 5/73

OTHER PUBLICATIONS

Adler, Tim J., et al. "Out of distribution detection for intra-operative functional imaging." arXiv preprint arXiv:1911.01877 (2019).*
Wang Feiyue et al: "A Robotic Vision System for Object Identification and Manipulation Using Synergetic Pattern Recognition", Robotics and Computer Integrated Manufacturing, Elsevier Science Publishers BV., Barking, GB, vol. 10, No. 6, Dec. 1, 1993 (Dec. 1, 1993), pp. 445-459, XP000449343, ISSN: 0736-5845, DOI: 10.1016/0736-5845(93)90008-8.

* cited by examiner

*Primary Examiner* — Jason Holloway
*Assistant Examiner* — Blake A Wood

(57) ABSTRACT

An autonomous system can detect out-of-distribution (OOD) data in robotic grasping systems, based on evaluating image inputs of the robotic grasping systems. Furthermore, the system makes various decisions based on detecting the OOD data, so as to avoid inefficient or hazardous situations or other negative consequences (e.g., damage to products). For example, the system can determine whether a suction-based gripper is optimal for grasping objects in a given scene, based at least in part on determining whether an image defines OOD data.

13 Claims, 4 Drawing Sheets

300a

119

121

109

107

115

106

113

111

300b

119

121

109

107

115

106

113

111

600

610

RUNTIME ASSESSMENT OF SUCTION GRASP FEASIBILITY

BACKGROUND

Autonomous operations, such as robotic grasping and manipulation, in unknown or dynamic environments present various technical challenges. Autonomous operations in dynamic environments may be applied to mass customization (e.g., high-mix, low-volume manufacturing), on-demand flexible manufacturing processes in smart factories, warehouse automation in smart stores, automated deliveries from distribution centers in smart logistics, and the like. In order to perform autonomous operations, such as grasping and manipulation, in some cases, robots may learn skills using machine learning (ML), in particular deep neural networks or reinforcement learning.

In various real-world applications of machine learning (ML), such as in robotics, there is often many variables and unknowns that make it challenging for ML models to handle diverse inputs reliably. When data is too different from a given model's training set, an out-of-distribution (OOD) uncertainty can be defined. It is recognized herein that OOD data presents a challenge to real-world ML models, and detecting such data can be critical to the performance or safety of a robotic system.

BRIEF SUMMARY

Embodiments of the invention address and overcome one or more of the described-herein shortcomings or technical problems by detecting out-of-distribution (OOD) data in robotic grasping systems, based on evaluating image inputs of the robotic grasping systems. Furthermore, the system makes various decisions based on detecting the OOD data, so as to avoid inefficient or hazardous situations or other negative consequences (e.g., damage to products).

In an example aspect, an autonomous system is configured to operate in an active industrial environment so as to define a runtime. The autonomous system can include a robot defining an end effector configured to grasp a plurality of objects within a workspace. The effector can define a suction-based gripper or a finger-based gripper. The system can further include a camera configured to capture an image of the workspace, so as to define a captured image. Further still, the system can include one or more processors, and memory storing instructions that, when executed by the one or more processors, cause the autonomous system to perform various operations, during the runtime. The operations can include detecting a bin within the workspace, wherein the bin contains the plurality of objects. Based on the captured image, the system can make a determination as to whether the plurality of objects define a structured scene or a disordered scene. At least partially based on the determination, the system can select the suction-based gripper or the finger-based gripper for grasping the plurality of objects, so as to define a selected gripper. In various examples, the system can instruct the robot to grasp the plurality of objects with the selected gripper.

In some examples, the system transforms the captured image to an image in a frequency domain, so as to define a frequency domain image. The system can perform a pattern recognition on the frequency domain image. Based on the pattern recognition, the system can determine whether the frequency domain image defines out of distribution data. When the frequency domain image defines out of distribution data, such that the captured image defines the disordered scene, the system can select the suction-based gripper for grasping the plurality of objects. When the frequency domain image does not define out of distribution data, such that the captured image defines the structured scene, the system can perform a segmentation on the plurality of objects. Based on the segmentation, the system can perform heuristic analysis on a first object of the plurality of objects in the captured image, so as to determine whether the plurality of objects that define the structured scene are graspable by the suction-based gripper. For example, the heuristic analysis can include determining whether the first object defines a planar surface that is exposed to the suction-based gripper. The heuristic analysis can further include determining whether the first defines a planar surface that is at the centroid of the first object. The heuristic analysis can further include, based on the surface area defined by the suction-based gripper, determining whether the suction-based gripper can fit on a contact surface defined by the first object. Furthermore, based on the heuristic analysis, the system can determine grasp points on each of the plurality of objects without a grasp neural network, and can instruct the suction-based gripper to grasp the plurality of objects at the respective grasp points.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an initial matter, it is recognized herein that detecting out-of-distribution (OOD) data can be crucial in robotic systems to avoid safety issues or compromise to a factory pipeline, among other consequences. OOD uncertainties can also decrease the prediction performance of a given model or network. With respect to automatic systems, it is further recognized herein that misinterpreted data from OOD data can cause a given system to have unpredictable behavior, which can risk the quality of products or safety or workers and machinery. For example, with respect to robotic grasping systems based on machine learning (ML) models, failure to detect OOD scenarios can make the system susceptible to making poor decisions. Such poor decisions, by way of example, can result in damage to an object being grasped or damage to the grasping device itself, among other negative consequences.

Embodiments described herein include an autonomous system that can distinguish scenes based on structure information, so as to identify OOD data samples, which can guide downstream robotic picking and/or placing policies. An example downstream task that can be performed by the system is determining whether a given scene defines a candidate for grasping based on grasp neural networks. In some examples, the system detects OOD data for robotic pick and place policies using only the color and depth channel of a given image.

Figure 1:
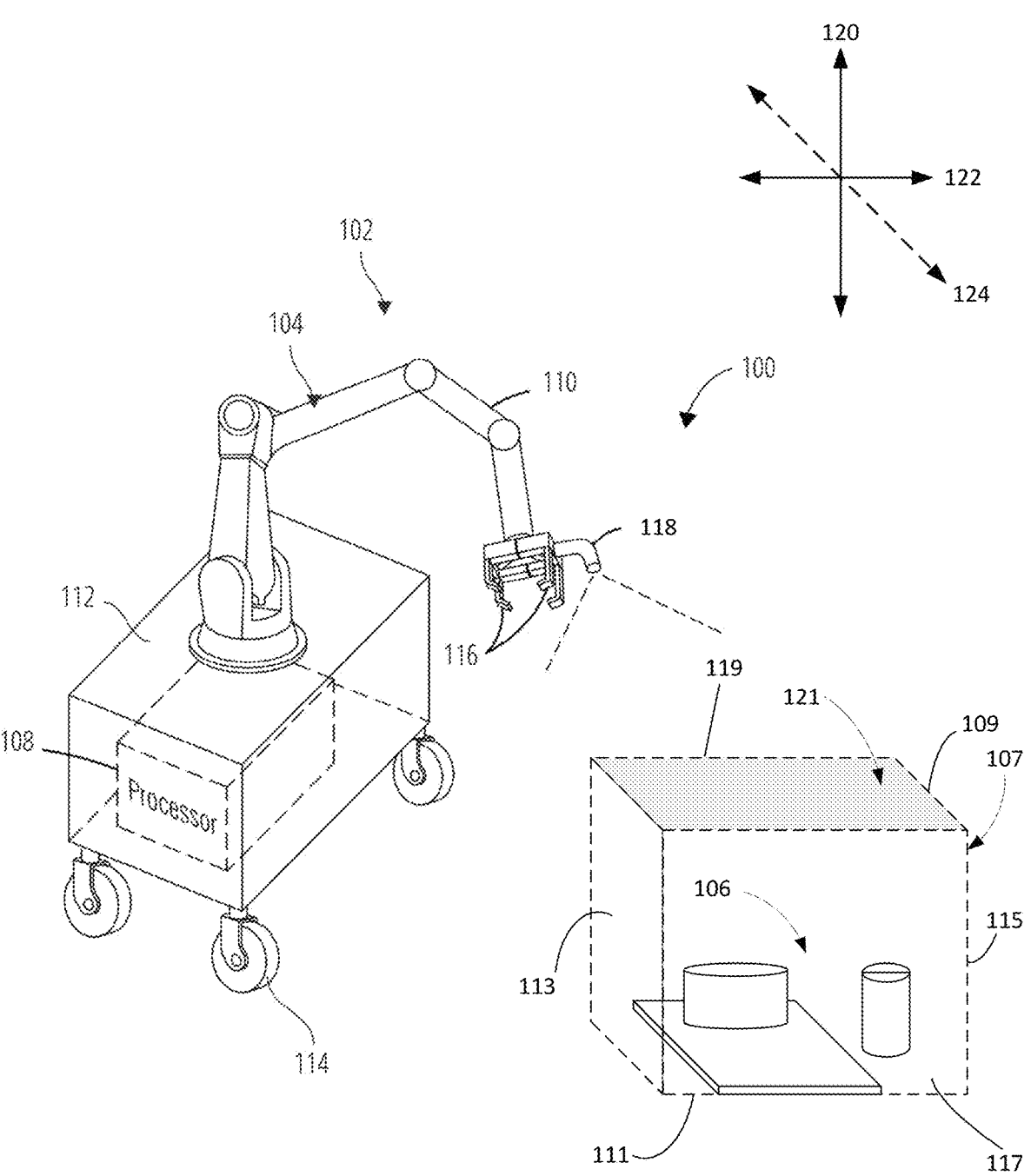
FIG. 1 shows an example autonomous system in an example physical environment or scene, wherein the autonomous system includes a robot configured to grasp various objects with various end effectors, such as a suction-based gripper or a finger gripper.

Referring now to FIG. 1, an example industrial or physical environment or workspace or scene 100 is shown. As used herein, a physical environment, workspace, or scene can refer to any unknown or dynamic industrial environment. Unless otherwise specified, physical environment, workspace, and scene can be used interchangeably herein, without limitation. For purposes of example, the object 106 can be disposed in a bin or container, for instance a bin 107, so as to be positioned for grasping. Unless otherwise specified herein, bin, container, tray, box, or the like can be used interchangeably, without limitation. By way of example, objects 106 can be picked from the bin 107 by one or more robots, and transported or placed in another location, for instance outside the bin 107. It will be understood that the objects 106 can be alternatively shaped or define alternative structures as desired, and all such objects are contemplated as being within the scope of this disclosure.

The physical environment 100 can include a computerized autonomous system 102 configured to perform one or more manufacturing operations, such as assembly, transport, or the like. The autonomous system 102 can include one or more robot devices or autonomous machines, for instance an autonomous machine or robot device 104, configured to perform one or more industrial tasks, such as bin picking, grasping, or the like. The system 102 can include one or more computing processors configured to process information and control operations of the system 102, in particular the autonomous machine 104. The autonomous machine 104 can include one or more processors, for instance a processor 108, configured to process information and/or control various operations associated with the autonomous machine 104. An autonomous system for operating an autonomous machine within a physical environment can further include a memory for storing modules. The processors can further be configured to execute the modules so as to process information and make determinations based on the information. It will be understood that the illustrated environment 100 and the system 102 are simplified for purposes of example. The environment 100 and the system 102 may vary as desired, and all such systems and environments are contemplated as being within the scope of this disclosure.

Still referring to FIG. 1, the autonomous machine 104 can further include a robotic arm or manipulator 110 and a base 112 configured to support the robotic manipulator 110. The base 112 can include wheels 114 or can otherwise be configured to move within the physical environment 100. The autonomous machine 104 can further include an end effector 116 attached to the robotic manipulator 110. The end effector 116 can include one or more tools configured to grasp and/or move objects 106. Example end effectors 116 include finger grippers or vacuum-based or suction grippers. The robotic manipulator 110 can be configured to move so as to change the position of the end effector 116, for example, so as to place or move objects 106 within the physical environment 100. The system 102 can further include one or more cameras or sensors, for instance a depth camera or three-dimensional (3D) point cloud camera 118, configured to detect or record objects 106 within the physical environment 100. The camera 118 can be mounted to the robotic manipulator 110 or otherwise configured to generate a 3D point cloud of a given scene, for instance the physical environment 100. Alternatively, or additionally, the one or more cameras of the system 102 can include one or more standard two-dimensional (2D) cameras that can record or capture images (e.g., RGB images or depth images) from different viewpoints. Those images can be used to construct 3D images. For example, a 2D camera can be mounted to the robotic manipulator 110 so as to capture images from perspectives along a given trajectory defined by the manipulator 110.

Still referring to FIG. 1, the camera 118 can be configured as an RGB-D camera defining a color and depth channel configured to capture images of the bin 107, and thus the objects 106 within the bin 107, along a first or transverse direction 120. Thus, the camera 118 can define a depth camera configured to capture depth images of the workspace 100 from a perspective along the transverse direction 120. For example, the bin 107 can define a top 109 end and a bottom end 111 opposite the top end 109 along the transverse direction 120. The bin 107 can further define a first side 113 and a second side 115 opposite the first side 113 along a second or lateral direction 122 that is substantially perpendicular to the transverse direction 120. The bin 107 can further define a front end 117 and a rear end 119 opposite the front end 117 along a third or longitudinal direction 124 that is substantially perpendicular to both the transverse and lateral directions 120 and 122, respectively. Thus, the first side 113, second side 115, front end 117 and rear end 119 can define walls of the bin or container 107. Though the illustrated container 107 defines a rectangular shape, it will be understood that bins or containers can be alternatively shaped or sized, and all such bins or containers are contemplated as being within the scope of this disclosure. By way of example, the container 107 may be alternatively shaped so as to define fewer than, or greater than, four walls.

Figure 2:
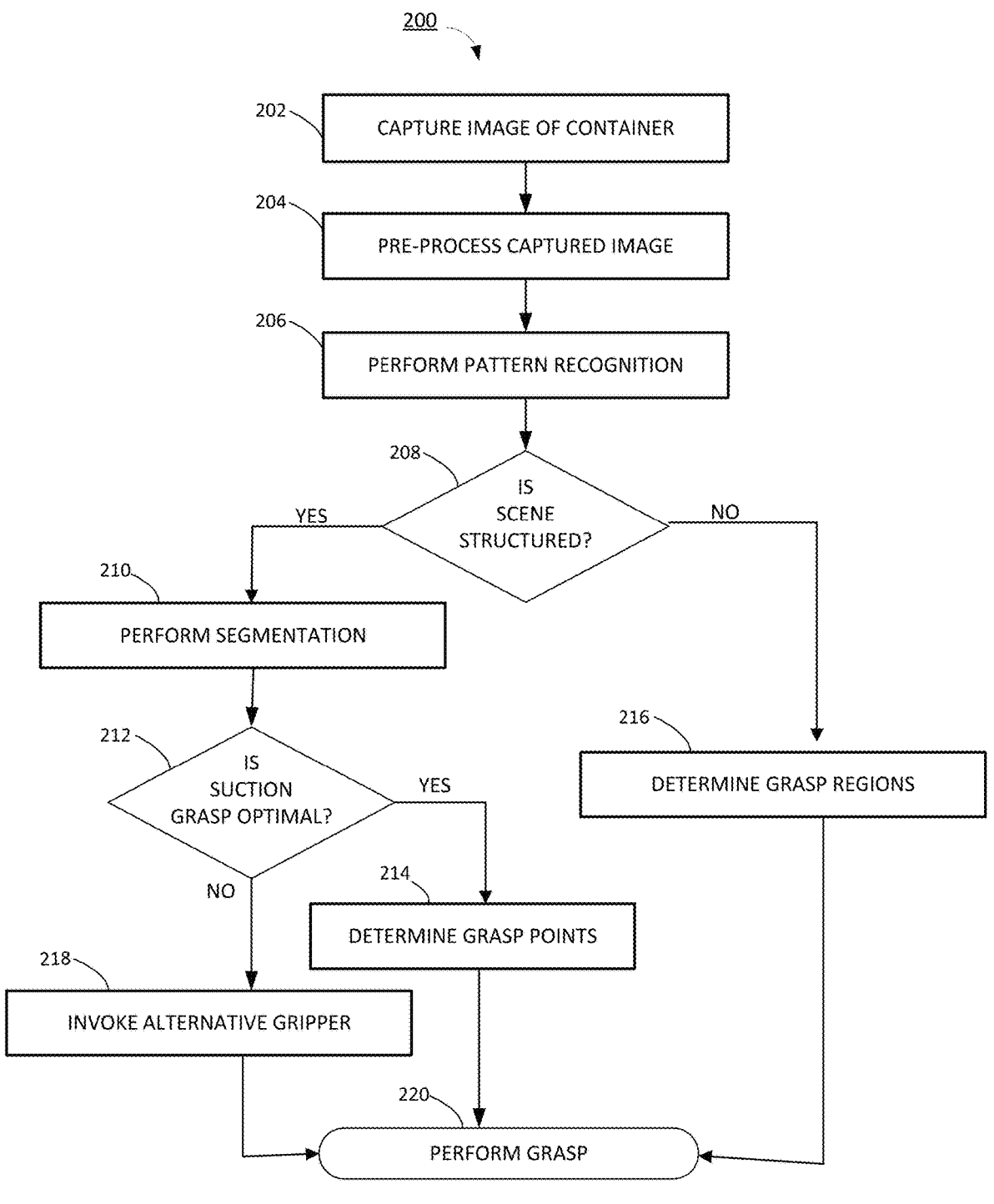
FIG. 2 is a flow diagram that illustrations example operations that can be performed by the autonomous system, so as to determine whether a suction-based gripper is feasible for a plurality of objects in a given scene, in accordance with an example embodiment.
Figure 3:
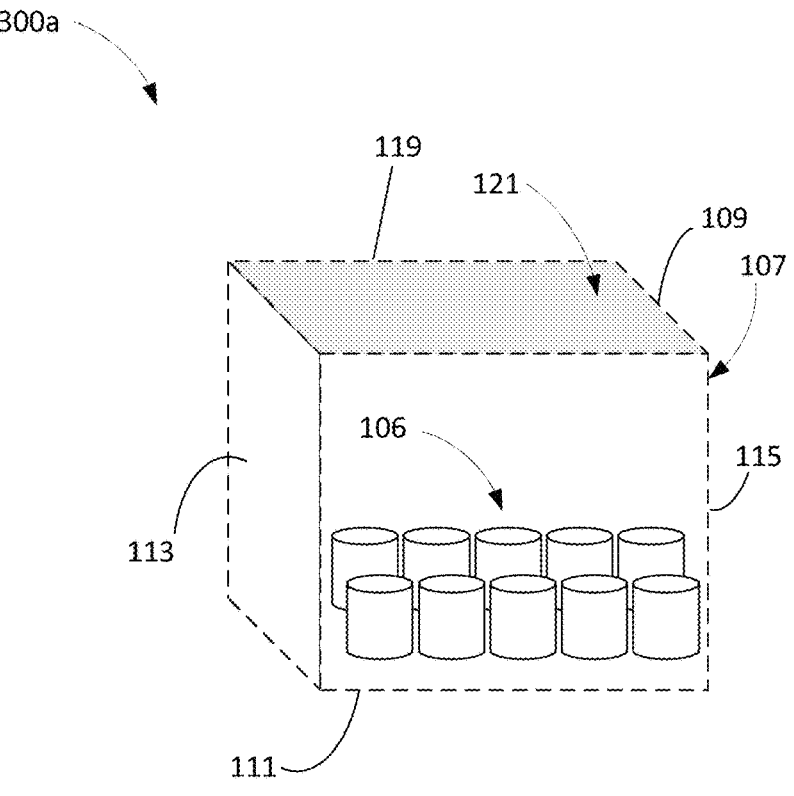
FIG. 3 illustrates an example structured scene and an example disordered scene, in accordance with example embodiments.
Figure 3:
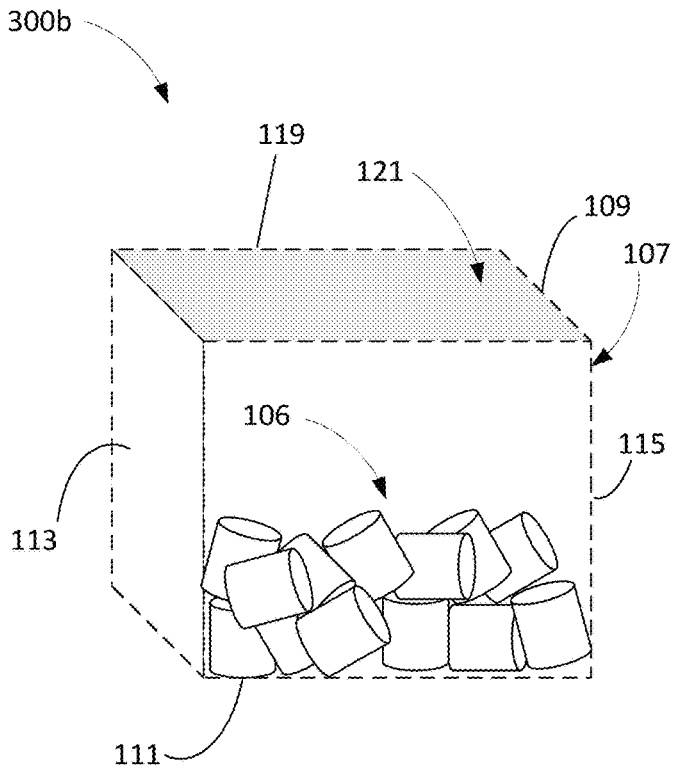

Referring to FIG. 2, example operations 200 are shown that can be performed by a computing system, for instance the autonomous system 102. At 202, the system 102, for instance the camera 118, can capture an image of the bin 107 and the objects 106 disposed within the bin 107. The captured image can define RGB (color) or RGB-D information (color and depth information) corresponding to the bin 107 and the objects 106 within the bin. Referring also to FIG. 3A, in some cases, the objects 106 might be arranged in a structured or ordered manner, such that the captured image defines an example structured scene 300a. Alternatively, referring to FIG. 3B, the objects 106 might be arranged in an unstructured or disorganized manner, such that the captured image defines an example chaotic or disordered scene 300b. At 204, the captured image (RGB or RGB-D) can be pre-processed by the autonomous system 102, for instance by a pre-processing module of the system 102.

For example, at 204, the system 102 can perform a fast Fourier transform (FFT) on the captured image so as to generate the captured image in the frequency domain, thereby pre-processing the captured image. The captured image in the frequency domain can be referred to as a frequency domain image. The frequency domain image can define various lines. Frequency domain images that correspond to captured images of structured or ordered scenes can define straight lines or lines that are parallel with one another. Frequency domain images that correspond to captured images of unstructured or chaotic scenes can define random lines that lack a defined relationship with one another. In various examples, at 206, the system performs pattern recognition on images after pre-processing. For example, the system 102 can detect the lines of the frequency domain images from the scenes, for instance the structured scene 300a or the disordered scene 300b, by performing computer vision techniques, such as template matching, Hough line transforming, or the like. At 208, for instance based on organizational information (e.g., patterns) extracted at 206, the system 102 can determine whether the given image defines a structured scene or a disordered scene. In particular, for example, the system 102 can classify a given image as defining a structured scene or disordered scene that includes OOD data. For example, the system 102 can define a binary classifier that determines whether frequency domain images define straight lines or random lines, thereby determining whether the images correspond to structured scenes or disordered scenes defining OOD data.

In another example, the classification performed at 208 can be performed by an autoencoder. In some cases, a deep neural network or AI model is trained on a set of images of objects, which can define a training data set. Based on its training, the deep neural network can calculate grasp scores for respective regions of a given object, for instance an object within the bin 107. For example, the robot device 104 and/or the system 102 can define one or more neural networks or autoencoders configured to learn various objects so as to identify poses, grasp points (or locations), and/or or affordances of various objects that can be found within various industrial environments. In an example embodiment, the training dataset that is used to train a grasping AI model can train an autoencoder to classify scenes as ordered or having OOD data (disordered). For example, the encoder portion of the autoencoder can extract latent space, which can define a compression of a given input image into a lower dimension. The autoencoder can reconstruct the input image as its output and, while doing so, can train itself to learn the most important features of the input image. Using the latent space, a distance metric can be determined that can be used to evaluate the similarity of given input data from the training distribution defined by the input training dataset. If the latent space of the given input data is farther than a predetermined threshold (distance metric) from the latent space of the training dataset, the input data can be classified as OOD data corresponding to a disordered scene.

In some cases, the captured images can be used as input into the autoencoder. Alternatively, or additionally, the captured images can be pre-processed (at 204) so as define frequency domain images, and such frequency domain images can be used as input into the autoencoder for classification. In yet another example, a given captured image can be divided into zones. The zones can correspond to different regions within a given image, so that the portions (zones) of the image can be processed in parallel with one another. For instance, a captured image of a given might be divided into two more zones so that the zones of the image can be processed in parallel with each other. By way of example, a first zone of a given image might include objects arranged in a structured configuration, and a second zone of the image of the same bin might include objects arranged in a chaotic configuration.

Referring again to FIG. 2, when a given scene is classified as structured (e.g., scene 300a), the process can proceed to 210, where the system 102 can perform instance-level segmentation on a given scene illustrated in a captured image (e.g., RGB or RGB-D image), so as to segment individual objects 106 within the given scene. The system 102 can conduct instance-level segmentation at runtime to segment out different objects in the scene. After the segmentation is performed, the process can proceed to 212, where the system 102 can determine, at runtime, whether a suction grasp is feasible (or optimal) on the objects of the given scene or whether an alternative gripper (e.g., finger-based or parallel jaw gripper) is better suited for the objects of the given scene. At 208, when a given scene is classified as chaotic or disordered (e.g., scene 300b), in various examples, a suction-based end effector is used, and the process can proceed to step 216 where the captured image can be input into a grasp neural network for determining grasp regions on the objects. It is recognized herein that when a given scene is chaotic or disordered, it is often difficult to find features or interest that make heuristic decisions (e.g., pose estimations based on models) to grasp objects. Thus, in such cases, grasp planning using RGB-D images and deep neural networks can be performed at 216. After grasp points are identified by a grasp neural network at 216, the process can proceed to 220, where grasps are performed at the determined grasp points.

It is recognized herein that when a scene is structured, the scene can define more patterns and features to exploit heuristic grasp planning as compared to when a scene is disordered. Thus, at 212, the system 102 can evaluate the scene based on various heuristic criteria or policy to determine whether the objects within the scene are graspable using suction-based end effectors. In some cases, determining whether a given object is graspable (at 212) can include determining whether regions on the surface defined by the object satisfy planarity criteria. In particular, the system 102 can determine whether a surface of an object that is exposed to the end effector 116 along the transverse direction 120 is sufficiently planar (e.g., flat) so that a suction-based gripper can grasp the exposed surface. In an example, the system 102 can determine incidence angles over samples of the surface of the object, so as to determine whether the surface is planar. In various examples, planar surfaces have substantially similar incidence angles (surface normal) for the regions that are sampled for grasping by a suction-based gripper, for instance regions near the centroid of the object. Additionally, or alternatively, to determine whether a given object is graspable by a suction-based gripper, the system 102 can determine whether the surface area of the gripper is substantially equivalent to a region of the object that defines a contact area for the gripper. Alternatively, if the surface area of the gripper is larger than a contact area on the object, the system 102 might determine that a suction grasp is not practical. Further still, for general grasp robustness, the system 102 can evaluate whether the graspable regions of the object are sufficiently close to, or within, a centroid area of the object surface. In some cases, the system 102 can first determine whether the objects define respective planar surfaces, and then after identifying the planar surfaces, the system 102 can determine whether those surfaces are within a centroid area of the object, and large enough to accommodate a particular suction-based gripper in forming a tight seal on the surface.

Still referring to FIG. 2, in some examples, to determine whether a given object in a structured scene is graspable by a suction grasp (at 212), the system 102 can perform a surface normal-based operation using RGB-D information from the captured image. In particular, for example, given the surface area or dimensions defined by the suction-based gripper, a width (e.g., diameter) of the suction-based gripper can be determined. Using the gripper width or dimensions, the system 102 can determine a patch region in pixels. A patch region can refer to select pixels of interest that span the surface area or dimensions defined by the suction-based gripper. By way of example, and without limitation, if the surface area of a given gripper is 5×5 pixels, the patch region in the captured image that corresponds to the sampled gripper is 5×5 pixels. Thus, the gripper can be centered in the middle pixel of the patch regions over the segmented pixels. The patch region in pixels (or pixel patch) can run over the segmented regions of the object in consideration. Thus, for example, based on the surface area defined by the gripper, the system 102 can determine whether the suction-based gripper can fit on a contact surface defined by an object. For the pixels that belong, the system 102 can compute an inclination angle of a normal vector to the object surface, thereby generating a normal vector for each pixel. The system 102 can covert the normal vectors to an incidence angle map. In various examples, regions are considered graspable if the values of the inclination angle are sufficiently close to each other, such that the region surface can be considered effectively planar. Additionally, the graspable regions can be assessed for robustness based on their respective proximity to the centroid of the segmented object. In some cases, the system 102 can select an empirical threshold distance to determine whether a region is sufficiently proximate to the centroid or not.

In some cases, the above-described graspability criteria and related computations that are evaluated at 212 can be performed for each object within a given scene. In some examples, if at least one object (e.g., a first object of the plurality objects within the container) within the scene defines a sufficient graspable region, for instance based on meeting the criteria described above, the system 102 can determine that a suction grasp is optimal for the scene and select the suction-based gripper for grasping, and the process can proceed to 214. In an example, if the objects within a given bin are substantially similar so as to define the same shape, the process can proceed to 214 after a sufficient graspable region for a suction-based end effector is identified on one of the objects in the structured scene. Thus, in accordance with various embodiments, the system 102 can determine whether scenes defined in captured images are structured, and then can perform heuristic-based analysis (e.g., determinations of planarity, centroid locations, patch regions) on the captured image so as to determine that a suction-based gripper is optimal for grasping the objects in the structured scene, rather than performing more computationally burdensome neural network grasping determinations in which a grasp neural network uses the captured image to predict a grasp heatmap of the objects based on offline training. Additionally, such neural networks might not determine grasp points in a chaotic scene that are as stable as the grasp points that heuristic analysis can determine in a structured scene.

After the system 102 determines that the structured scene 300a contains objects that can be grasped with a suction-based gripper, the process can proceed to 214, where the system 102 can determine grasp points, for instance by performing further heuristic-based analysis such as edge detection and contour center prediction. In some cases, grasp points on a particular object may be determined at 212 in the process of determining whether a suction-grasp is feasible. In those cases, additional grasp points might be determined on other objects within the bin or on the same object, so that that best grasp point, for instance the grasp point most proximate to the centroid of the respective object, can be selected. After the grasp points are determined at 214, the system 102, in particular the robot 104, can perform the grasps of the objects within the structured scene, at 220, using the suction-based end effector 116.

When the system 102 determines (at 212) that a suction grasp is not optimal for the structured scene, the process can proceed to step 218, where an alternative gripper is invoked. By way of example, the system 102 might determine that the objects within the structed scene are not sufficiently planar, thereby determining that a suction grasp is not feasible or optimal. Alternatively, or additionally, the system 102 might determine that there are planar surfaces on a given object, but those planar surfaces are not sufficiently close to the centroid, thereby determining that a suction grasp is not feasible or optimal. Alternatively still, or additionally, the system 102 might determine that the surface area defined by the suction-based gripper is larger than the planar contact surface on the objects, such that a suction-based gripper is not feasible or optimal.

In various examples, structured scenes might present less graspable regions for a suction-based gripper than a chaotic scene. By way of example, a structured scene might include objects without graspable surfaces for a suction gripper, but with a cavity or slot for jaw grippers. At 218, in some cases, the system can perform template detection so as to detect the cavity or slot in the objects. Based on the template detection, the system can determine to invoke grasping with a parallel jaw gripper or a gripper that is otherwise alternative to a suction-based gripper, such that the end effector 116 can perform the grasp of the objects 106 by sliding through the object cavity. At 220, the system 102 can perform the grasp on the objects 106 within the structured scene 302a. Thus, at least partially based on the determination as to whether the captured image includes a plurality of objects that define a structured scene or a disordered scene (at 208), the system 102 can select a suction-based gripper or a finger-based gripper for grasping the plurality of objects, so as to define a selected gripper. At 220, the system 102 can instruct the robot 104 to grasp the plurality of objects with the selected gripper.

Thus, as described herein, the system 102 can assess a given input image sample for a feasibility check to evaluate the outcome of a policy for suction grasping. The processing of the image can provide an indication as to whether suction grasping is suitable for the given scene, in contrast to an approach in which image is passed through a suction grasping pipeline and the assessment of graspability is predicted based on the results of the grasping pipeline. For example, without being bound by theory, embodiments described herein can perform the suction-grasp feasibility evaluation by directly observing the captured image, without triggering a burdensome grasp point computation involving neural networks, which might further involve predicting a low grasping score for the scene and thresholding the score to assign a binary decision, among other processing. Suction grasp evaluations performed by a grasping neural network, such as those performed at 216, can predict grasp score for each pixel in a captured image. It is recognized herein that even a low or high grasp score might not correctly predict whether the grasp at the corresponding grasp point will fail or succeed because, among other reasons, threshold values are often set empirically or otherwise might not be accurate. Thus, it is recognized herein that when heuristic operations (e.g., planarity, centroid, patch regions) are performed on structured scenes, a more robust indication of whether the grasp succeeds can result. To determine whether heuristic operations are performed, as described herein, images can be first evaluated so to determine whether the associated scenes are structured or disordered. Furthermore, in some examples, when the bin contains the same objects only one object might be evaluated at 212 because it is recognized herein that when the grasp is determined to succeed on an object, it is likely that the grasps will succeed on substantially similar objects in the same bin given the structured configuration of the bin. Additionally, when the grasp is determined to fail on an object, it is likely that the grasps will also fail on substantially similar objects within the same bin given the structured configuration of the bin.

Figure 4:
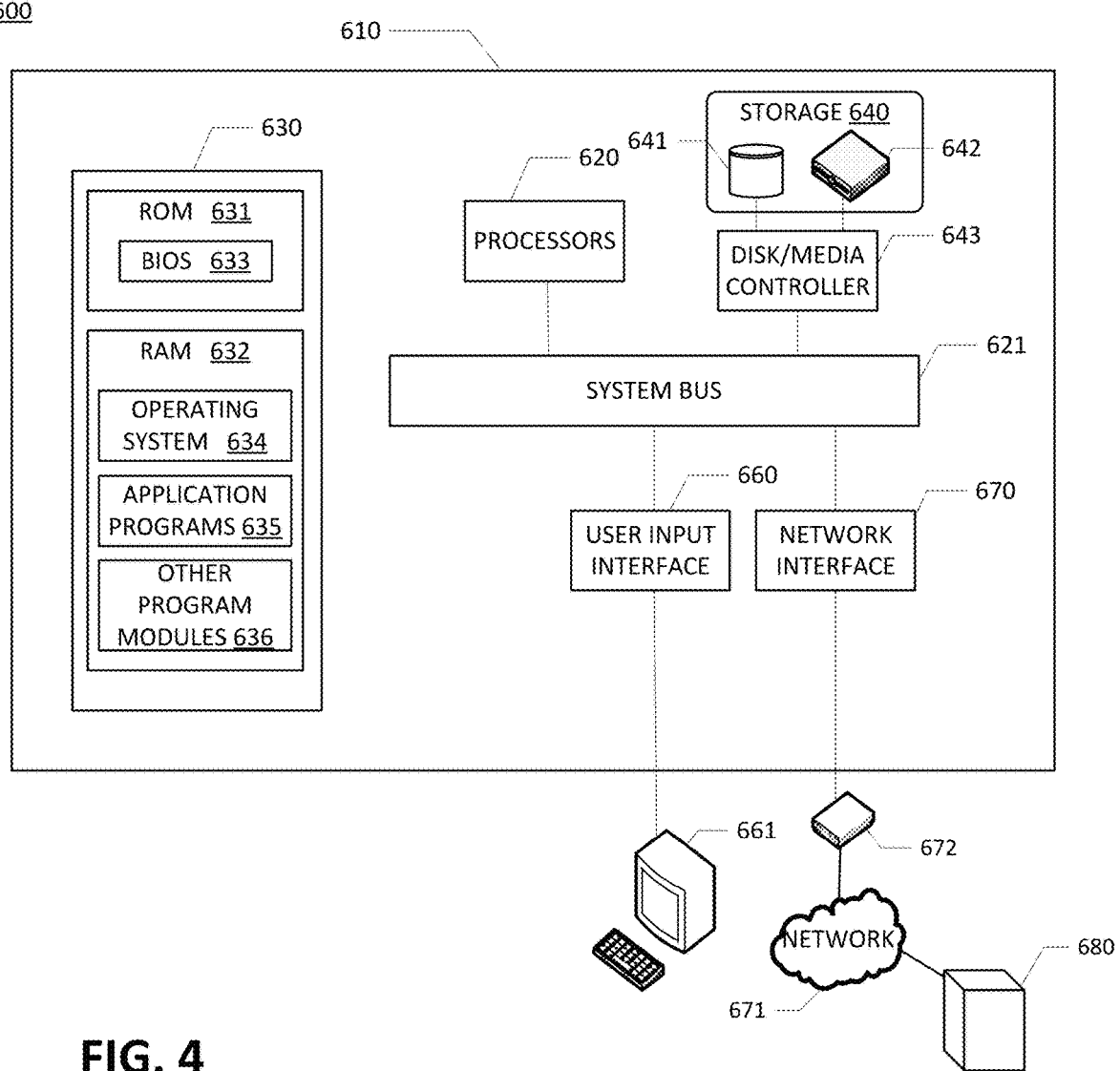
FIG. 4 illustrates a computing environment within which embodiments of the disclosure may be implemented.

FIG. 4 illustrates an example of a computing environment within which embodiments of the present disclosure may be implemented. A computing environment 600 includes a computer system 610 that may include a communication mechanism such as a system bus 621 or other communication mechanism for communicating information within the computer system 610. The computer system 610 further includes one or more processors 620 coupled with the system bus 621 for processing the information. The autonomous system 102 may include, or be coupled to, the one or more processors 620.

The processors 620 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, and other program modules 636. Application programs 635 may also include a user portal for development of the application program, allowing input parameters to be entered and modified as necessary.

The operating system 634 may be loaded into the memory 630 and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of the program modules depicted as being stored in the data storage 640. The operating system 634 may include any operating system now known or which may be developed in the future including, but not limited to, any server operating system, any mainframe operating system, or any other proprietary or non-proprietary operating system.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid state drive). Storage devices 640 may be added to the computer system 610 using an appropriate device interface (e.g., a small computer system interface (SCSI), integrated device electronics (IDE), Universal Serial Bus (USB), or FireWire). Storage devices 641, 642 may be external to the computer system 610.

The computer system 610 may also include a field device interface 665 coupled to the system bus 621 to control a field device 666, such as a device used in a production line. The computer system 610 may include a user input interface or GUI 661, which may comprise one or more input devices, such as a keyboard, touchscreen, tablet and/or a pointing device, for interacting with a computer user and providing information to the processors 620.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium of storage 640, such as the magnetic hard disk 641 or the removable media drive 642. The magnetic hard disk 641 (or solid state drive) and/or removable media drive 642 may contain one or more data stores and data files used by embodiments of the present disclosure. The data store 640 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 680. The network interface 670 may enable communication, for example, with other remote devices 680 or systems and/or the storage devices 641, 642 via the network 671. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 4 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 680, and/or hosted on other computing device(s) accessible via one or more of the network(s) 671, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 maybe performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the computer system 610 may include alternate and/or additional hardware, software, or firmware components beyond those described or depicted without departing from the scope of the disclosure. More particularly, it should be appreciated that software, firmware, or hardware components depicted as forming part of the computer system 610 are merely illustrative and that some components may not be present or additional components may be provided in various embodiments. While various illustrative program modules have been depicted and described as software modules stored in system memory 630, it should be appreciated that functionality described as being supported by the program modules may be enabled by any combination of hardware, software, and/or firmware. It should further be appreciated that each of the above-mentioned modules may in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may" unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An autonomous system configured to operate in an active industrial environment so as to define a runtime, the autonomous system comprising:

a robot defining an end effector configured to grasp a plurality of objects within a container, the end effector including a suction-based gripper or and a finger-based gripper;

a camera configured to capture an image of the container containing the plurality of objects, so as to define a captured image;

one or more processors; and a memory storing instructions that, when executed by the one or more processors, cause the autonomous system to, during the runtime:

based on the captured image, make a determination as to whether the plurality of objects define a structured scene or a disordered scene, wherein for making the determination, the instructions cause the automation system:

transform the captured image to an image in a frequency domain, so as to define a frequency domain image;

perform a pattern recognition on the frequency domain image; and based on the pattern recognition, determine whether the frequency domain image defines out of distribution data;

at least partially based on the determination, select the suction-based gripper or the finger-based gripper for grasping the plurality of objects, so as to define a selected gripper; and instruct the robot to grasp the plurality of objects with the selected gripper.

2. The autonomous system as recited in claim 1, the memory further storing instructions that, when executed by the one or more processors, further cause the autonomous system to:

when the frequency domain image defines out of distribution data, such that the captured image defines the disordered scene, select the suction-based gripper for grasping the plurality of objects.

3. The autonomous system as recited in claim 1, the memory further storing instructions that, when executed by the one or more processors, further cause the autonomous system to:

when the frequency domain image does not define out of distribution data, such that the captured image defines the structured scene, perform a segmentation on each of the plurality of objects; and based on the segmentation, perform heuristic analysis on a first object of the plurality of objects in the captured image, so as to determine whether the plurality of objects that define the structured scene are graspable by the suction-based gripper.

4. The autonomous system as recited in claim 3, the memory further storing instructions that, when executed by the one or more processors, further cause the autonomous system to:

determine whether the first object defines a planar surface that is exposed to the suction-based gripper.

5. The autonomous system as recited in claim 3, wherein the first object defines a centroid, the memory further storing instructions that, when executed by the one or more processors, further cause the autonomous system to:

determine whether the first defines a planar surface that is at the centroid of the first object.

6. The autonomous system as recited in claim 3, the suction-based gripper defining a surface area, the memory further storing instructions that, when executed by the one or more processors, further cause the autonomous system to:

based on the surface area, determine whether the suction-based gripper can fit on a contact surface defined by the first object.

7. The autonomous system as recited in claim 3, the memory further storing instructions that, when executed by the one or more processors, further cause the autonomous system to:

based on the heuristic analysis, determine grasp points on each of the plurality of objects without a grasp neural network; and instruct the suction-based gripper to grasp the plurality of objects at the respective grasp points.

8. A method performed by an autonomous system including a robot configured to grasp objects from containers with a suction-based gripper and a finger-based gripper, the method comprising:

capturing an image of a container containing a plurality of objects, so as to define a captured image;

based on the captured image, making a determination as to whether the plurality of objects define a structured scene or a disordered scene, wherein making the determination comprises:

transforming the captured image to an image in a frequency domain, so as to define a frequency domain image;

performing a pattern recognition on the frequency domain image; and based on the pattern recognition, determining whether the frequency domain image defines out of distribution data at least partially based on the determination, selecting the suction-based gripper or the finger-based gripper for grasping the plurality of objects, so as to define a selected gripper; and instructing the robot to grasp the plurality of objects with the selected gripper.

9. The method as recited in claim 8, the method further comprising:

when the frequency domain image defines out of distribution data, such that the captured image defines the disordered scene, selecting the suction-based gripper for grasping the plurality of objects.

10. The method as recited in claim 8, the method further comprising:

when the frequency domain image does not define out of distribution data, such that the captured image defines the structured scene, performing a segmentation on each of the plurality of objects; and based on the segmentation, performing heuristic analysis on a first object of the plurality of objects in the captured image, so as to determine whether the plurality of objects that define the structured scene are graspable by the suction-based gripper.

11. The method as recited in claim 10, wherein performing the heuristic analysis further comprises:

determining whether the first object defines a planar surface that is exposed to the suction-based gripper.

12. The method as recited in claim 10, wherein the first object defines a centroid and the suction-based gripper defines a surface area, and performing the heuristic analysis further comprises:

determining whether the first object defines a planar surface that is at the centroid of the first object; and based on the surface area, determining whether the suction-based gripper can fit on the centroid of the first object.

13. The method as recited in claim 10, the method further comprising:

based on the heuristic analysis, determining grasp points on each of the plurality of objects without a grasp neural network; and instructing the suction-based gripper to grasp the plurality of objects at the respective grasp points.

* * * * *